US009084273B2

(12) United States Patent
Khan

(10) Patent No.: US 9,084,273 B2
(45) Date of Patent: *Jul. 14, 2015

(54) APPARATUS AND METHOD FOR ADAPTIVE CHANNEL QUALITY FEEDBACK IN A MULTICARRIER WIRELESS NETWORK

(71) Applicant: Samsung Electronics Co., Ltd., Suwon-si, Gyeonggi-do (KR)

(72) Inventor: Farooq Khan, Allen, TX (US)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/271,065

(22) Filed: May 6, 2014

(65) Prior Publication Data

US 2014/0241289 A1    Aug. 28, 2014

Related U.S. Application Data

(63) Continuation of application No. 13/606,907, filed on Sep. 7, 2012, now Pat. No. 8,717,905, which is a continuation of application No. 12/945,567, filed on Nov. 12, 2010, now Pat. No. 8,275,386, which is a (Continued)

(51) Int. Cl.
*H04B 7/00* (2006.01)
*H04W 72/08* (2009.01)
(Continued)

(52) U.S. Cl.
CPC ........... *H04W 72/085* (2013.01); *H04L 1/0026* (2013.01); *H04L 5/006* (2013.01); *H04L 5/0044* (2013.01); *H04L 5/0091* (2013.01);
(Continued)

(58) Field of Classification Search
None
See application file for complete search history.

(56) References Cited

U.S. PATENT DOCUMENTS 7,502,310 B2    3/2009 Hwang et al.
8,229,448 B2 *  7/2012 Khan ................... 455/452.2
(Continued)

FOREIGN PATENT DOCUMENTS

EP    0415898 A1    3/1991
EP    0462952 A1    12/1991
(Continued)

OTHER PUBLICATIONS

Extended European Search Report dated Jul. 11, 2012 in connection with European Patent Application No. 06015981.1; 11 pp.

(Continued)

*Primary Examiner* — Kevin C Harper

(57) ABSTRACT

A subscriber station for use in a wireless network capable of communicating according to a multicarrier protocol determines a total average signal level across N subbands within a channel, where each subband comprises a plurality of subcarriers. The subscriber station also determines a first average signal level within a first subband. The subscriber station then transmits a channel quality indicator (CQI) feedback message to the wireless network. The CQI feedback message comprises a first data indicating the total average signal level across the N subbands and a second data indicating the first average signal level within the one subband. The first data may indicate the total average signal level as an absolute value and the second data may indicate the first average signal level relative to the total average signal level using one of two or more unequal quantization levels.

20 Claims, 9 Drawing Sheets

Related U.S. Application Data continuation of application No. 11/475,709, filed on Jun. 27, 2006, now Pat. No. 8,229,448.

(60) Provisional application No. 60/704,331, filed on Aug. 1, 2005.

(51) Int. Cl.
*H04L 1/00* (2006.01)
*H04W 24/08* (2009.01)
*H04L 5/00* (2006.01)
*H04L 27/26* (2006.01)

(52) U.S. Cl.
CPC ............ *H04W 24/08* (2013.01); *H04L 5/0007* (2013.01); *H04L 27/261* (2013.01); *H04L 27/2626* (2013.01); *H04L 27/2647* (2013.01)

(56) References Cited

U.S. PATENT DOCUMENTS

| | | | | |
|---|---|---|---|---|
| 8,275,386 | B2* | 9/2012 | Khan | 455/452.2 |
| 8,717,905 | B2* | 5/2014 | Khan | 370/241 |
| 2003/0123559 | A1 | 7/2003 | Classon et al. | |
| 2003/0235162 | A1 | 12/2003 | Chao et al. | |
| 2005/0025039 | A1 | 2/2005 | Hwang et al. | |
| 2005/0105589 | A1 | 5/2005 | Sung et al. | |
| 2005/0201295 | A1* | 9/2005 | Kim et al. | 370/241 |
| 2007/0026808 | A1 | 2/2007 | Love et al. | |
| 2007/0026810 | A1 | 2/2007 | Love et al. | |
| 2007/0258366 | A1 | 11/2007 | Imamura | |
| 2007/0298728 | A1 | 12/2007 | Imamura et al. | |
| 2008/0056181 | A1 | 3/2008 | Imamura et al. | |
| 2009/0280749 | A1 | 11/2009 | Tanno et al. | |
| 2013/0322340 | A1 | 12/2013 | Nishio et al. | |

FOREIGN PATENT DOCUMENTS

| | | |
|---|---|---|
| JP | 2005-050545 | 2/2005 |
| JP | 2005-073259 | 3/2005 |
| JP | 2005-160079 | 6/2005 |
| JP | 2006-287754 | 10/2006 |
| JP | 2007-043696 | 2/2007 |
| JP | 2007-043697 | 2/2007 |
| KR | 1020050005993 A | 1/2005 |
| KR | 1020050014695 A | 2/2005 |
| KR | 1020050028968 A | 3/2005 |
| RU | 2216862 C2 | 11/2003 |
| WO | WO 94/19876 A1 | 9/1994 |
| WO | WO 2004/098072 A2 | 11/2004 |
| WO | WO 2006/028204 A1 | 3/2006 |
| WO | WO 2006/030867 A1 | 3/2006 |
| WO | WO 2006/059566 A1 | 6/2006 |

OTHER PUBLICATIONS

NTT DoCoMo; R1-050590; "Physical Channels and Multiplexing in Evolved UTRA Downlink"; 3GPP TSG RAN WG1 Ad Hoc on LTE; Jun. 20-21, 2005; 24 pp.

Samsung; R1-073562; "Uplink CQI Report Format"; 3GPP TSG RAN WG1 Meeting #50; Aug. 20-24, 2007; 4 pp.

* cited by examiner

APPARATUS AND METHOD FOR ADAPTIVE CHANNEL QUALITY FEEDBACK IN A MULTICARRIER WIRELESS NETWORK

CROSS-REFERENCE TO RELATED APPLICATIONS AND CLAIM OF PRIORITY

This application is a continuation of U.S. patent application Ser. No. 13/606,907 filed Sep. 7, 2012, now U.S. Pat. No. 8,717,905, which is a continuation of U.S. patent application Ser. No. 12/945,567 filed Nov. 12, 2010, now U.S. Pat. No. 8,275,386, which is a continuation of U.S. patent application Ser. No. 11/475,709 filed Jun. 27, 2006, now U.S. Pat. No. 8,229,448, and claims priority to U.S. Provisional Patent Application No. 60/704,331, filed Aug. 1, 2005. The content of the above-identified patent documents is incorporated herein by reference.

TECHNICAL FIELD

The present application relates generally to wireless communications and, more specifically, to a mechanism for providing channel quality feedback in a multicarrier wireless network.

BACKGROUND

Orthogonal frequency division multiplexing (OFDM) is a multicarrier transmission technique in which a user transmits on many orthogonal frequencies (or subcarriers or tones). The orthogonal subcarriers (or tones) are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user.

The performance of a wireless network may be improved by implementing channel quality feedback. Receiving stations (e.g., subscriber stations) in a wireless network measure selected parameters of the received signal. The measured parameters and, optionally, calculated values derived from the measured parameters are then transmitted back to the wireless network in a standard message, sometimes called a channel quality indicator (CQI) message. The network then uses the CQI information to optimize the signal transmitted in the forward channel (or downlink), thereby improving reception in the subscriber stations. Similar techniques may be used by the subscriber stations to improve performance in the reverse channel (or uplink).

A variety of channel quality feedback techniques are commonly used in multichannel wireless networks, such as OFDM and OFDMA networks. However, multichannel wireless networks typically allocate a subband containing a group of subcarriers (or tones) to each subscriber station and these conventional channel quality feedback techniques commonly transmit an absolute channel quality indicator (CQI) value for each subband. Transmitting an absolute CQI value for each subband requires a prohibitive amount of feedback overhead.

Therefore, there is a need for improved OFDM and OFDMA transmission system that minimize the amount of bandwidth required to provide channel quality feedback.

SUMMARY

A subscriber station is provided for use in a wireless network capable of communicating according to a multicarrier protocol, such as OFDM or OFDMA. In one embodiment, the subscriber station is capable of determining a total average signal level across N subbands of a channel, where each of the N subbands comprises a plurality of subcarriers. The subscriber station also determines a first average signal level within a first one of the N subbands. The subscriber station then transmits a channel quality indicator (CQI) feedback message to the wireless network. The CQI feedback message comprises a first data indicating the total average signal level and a second data indicating the first average signal level. The first data may indicate the total average signal level as an absolute value and the second data field may indicate the first average signal level relative to the total average signal level using one of the two or more unequal quantization levels.

In another embodiment, a base station is provided for use in a wireless network capable of communicating with a plurality of subscriber stations according to a multi-carrier protocol. The base station transmits in a downlink to the plurality of subscriber stations using N subbands within a channel, where each of the N subbands comprises a plurality of subcarriers. The base station is capable of receiving from a first one of the plurality of subscriber stations a channel quality indicator (CQI) feedback message. The CQI feedback message comprises a first data indicating a total average signal level determined by the first subscriber station across the N subbands and a second data indicating a first average signal level determined by the first subscriber station within a first one of the N subbands, represented by a value indicating a relative difference between the average signal level within the one subband and the average signal level across the N subbands using one of two or more unequal quantization levels. The base station uses the CQI feedback message to allocate selected ones of the N subbands for transmitting in the downlink to the first subscriber station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

A channel quality indicator (CQI) feedback technique is disclosed for use in multicarrier networks. A receiving device (e.g., a subscriber station) determines the average channel quality over the entire frequency range used by the network. The relative difference between the average channel quality and the subband average channel quality is sent back to the transmitting device. Relative channel quality indication (RCQI) levels are defined and an RCQI level is fed back for each subband of the wireless network.

Figure 1:
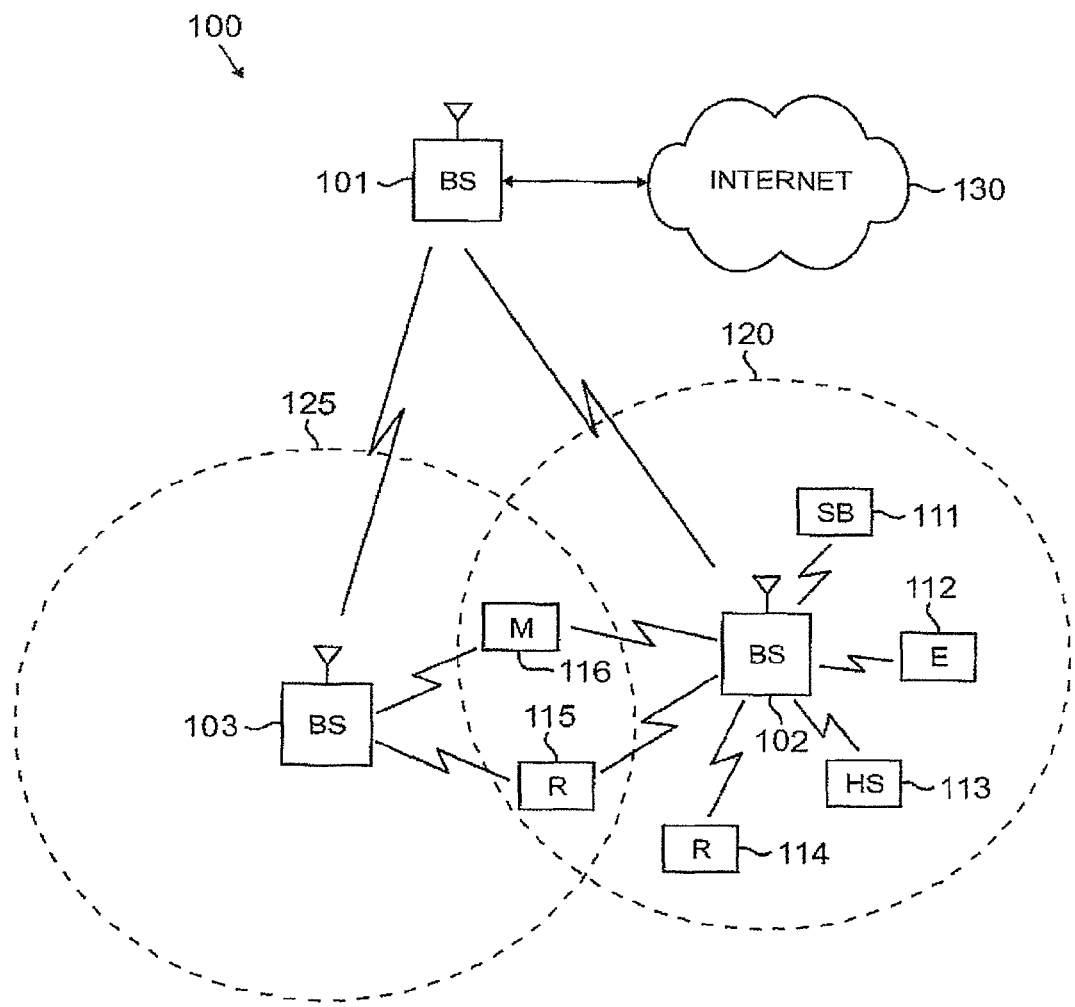
FIG. 1 illustrates an exemplary wireless network that implements adaptive channel quality feedback techniques according to the principles of the present disclosure.

FIG. 1 illustrates exemplary wireless network 100, which implements adaptive channel quality feedback techniques in an exemplary OFDMA (or OFDM) network according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
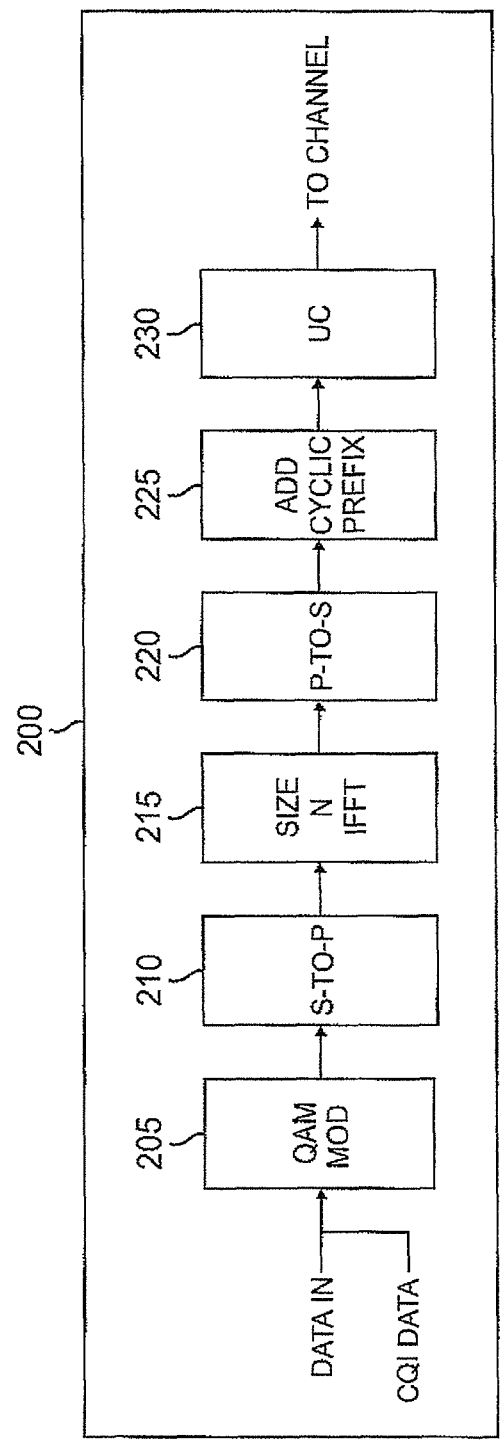
FIG. 2A is a high level block diagram of an OFDMA transmitter according to one embodiment of the disclosure.
Figure 2B:
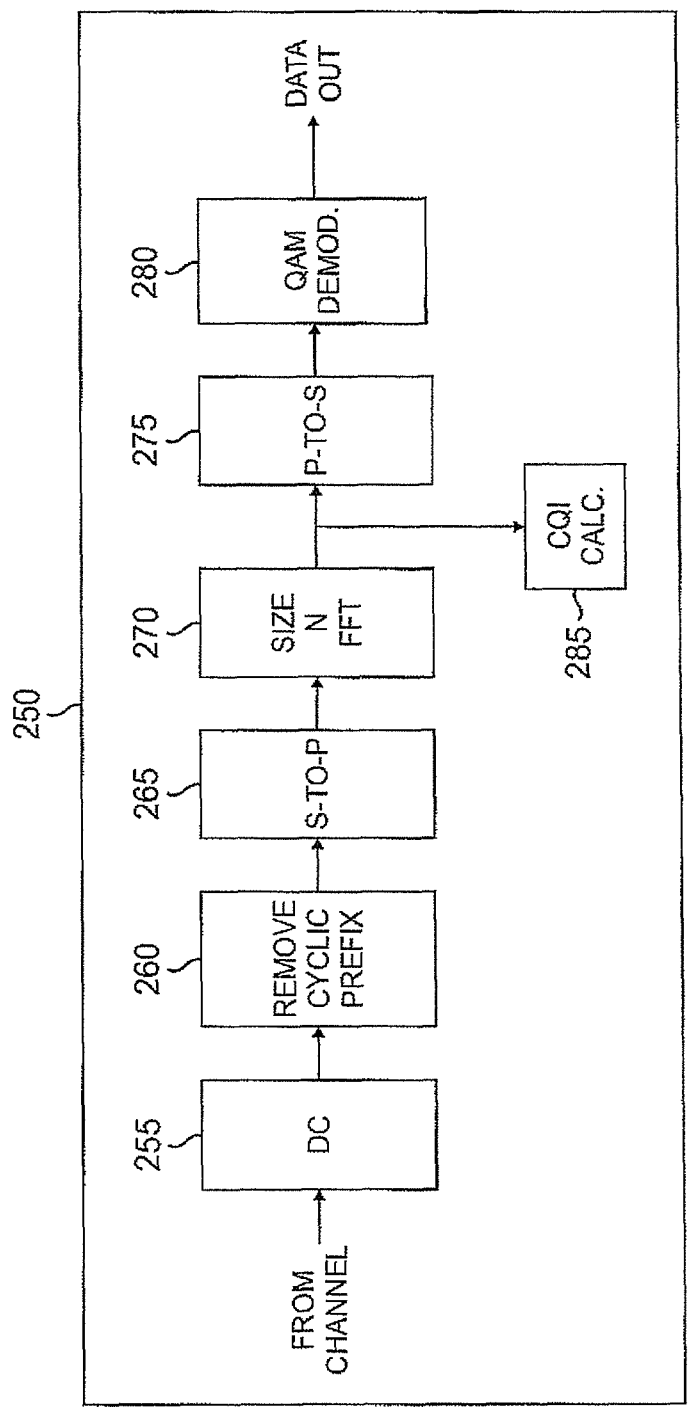
FIG. 2B is a high level block diagram of an OFDMA receiver according to one embodiment of the disclosure.

FIG. 2A is a high-level diagram of orthogonal frequency division multiple access (OFDMA) transmitter 200. FIG. 2B is a high-level diagram of orthogonal frequency division multiple access (OFDMA) receiver 250. OFDMA transmitter 200 or OFDMA receiver 250, or both, may be implemented in any of base stations 101-103 of wireless network 100. Similarly, OFDMA transmitter 200 or OFDMA receiver 250, or both, may be implemented in any of subscriber stations 111-116 of wireless network 100.

OFDMA transmitter 200 comprises quadrature amplitude modulation (QAM) modulator 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. OFDMA receiver 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, quadrature amplitude modulation (QAM) demodulator 280, and channel quality indicator (CQI) calculation block 285.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed so as to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of N may be any integer number (i.e., 1, 2, 3, 4, etc.), while for FFT and IFFT functions, the value of N may be any integer number that is a power of two (i.e., 1, 2, 4, 8, 16, etc.).

In OFDMA transmitter 200, QAM modulator 205 receives a set of information bits and modulates the input bits to produce a sequence of frequency-domain modulation symbols. In selected feedback control message, these information bits may include channel quality indicator (CQI) information, as described herein. Serial-to-parallel block 210 converts (i.e., de-multiplexes) the serial QAM symbols to parallel data to produce N parallel symbol streams where N is the IFFT/FFT size used in transmitter 200 and receiver 250. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal.

Finally, up-converter 230 modulates (i.e., up-converts) the output of add cyclic prefix block 225 to RF frequency for transmission via the forward channel or reverse channel, depending on whether OFDMA transmitter 200 is implemented in a base station or a subscriber station. The signal from add cyclic prefix block 225 may also be filtered at baseband before conversion to RF frequency. The time-domain signal transmitted by OFDMA transmitter 200 comprises multiple overlapping sinusoidal signals corresponding to the data symbols transmitted.

In OFDMA receiver 250, an incoming RF signal is received from the forward channel or reverse channel, depending on whether OFDMA receiver 250 is implemented in a base station or a subscriber station. OFDMA receiver 250 reverses the operations performed in OFDMA transmitter 200. Down-converter 255 down-converts the received signal to baseband frequency and remove cyclic prefix 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of QAM data symbols. QAM demodulator 280 then demodulates the QAM symbols to recover the original input data stream.

In the exemplary embodiment in FIG. 2B, channel quality indicator (CQI) calculation block 285 measures the signal at the output of Size N FFT block 270 to determine one or more channel quality parameters according to the selected channel quality feedback algorithm. However, in alternate embodiments, channel quality indicator (CQI) calculation block 285 may measure the received signal at other points in the receive path, such as at the output of remove cyclic prefix block 260.

According to the principles of the present disclosure, CQI calculation block 285 is capable of determining the average channel quality across all subcarriers at the output of Size N FFT block 270 (i.e., the entire frequency range of carrier used by network 100). CQI calculation block 285 also determines the relative difference between the average channel quality and the subband average channel quality in each subband. This CQI information (as shown in FIG. 2A) is then sent back to the transmitting device using relative channel quality indication (RCQI) levels as described herein.

Figure 3:
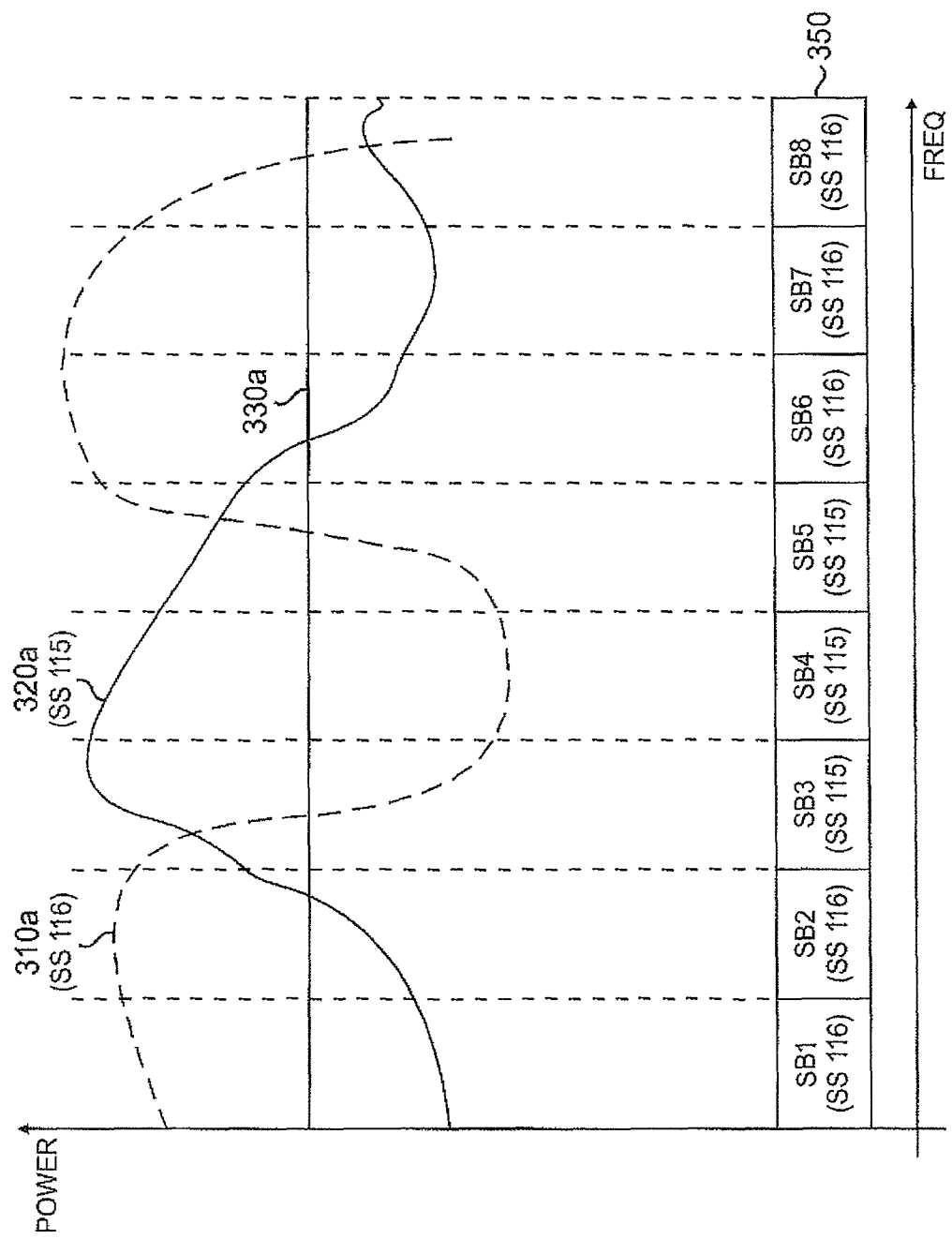
FIG. 3 illustrates resource allocation according to the principles of the present disclosure.

FIG. 3 illustrates the allocation of subcarriers in a frequency domain scheduling scheme in OFDMA wireless network 100 according to the principles of the present disclosure. In this example, a total of 512 OFDM subcarriers (or tones) are divided into 8 groups (or subbands) of 64 contiguous subcarriers (SCs) each. By way of example, the first subband, SB1, contains subcarriers SC1-SC64, the second subband, SB2, contains subcarriers SC65-SC128, and so forth. The eighth (last) subband, SB8, contains subcarriers SC449-SC512.

A given subscriber station (e.g., SS 116 or SS 115) may be allocated one or more of these subbands. In FIG. 3, the eight subbands, SB1-SB8, are allocated according to channel fading at the receiver for the case of two subscriber stations, SS 115 and SS 116. The received signals at SS 116 and SS 115 experience frequency-selective fading due to multipath effects. Curve 330a represents a flat-fading characteristic. Dotted-line curve 310a represents the frequency selective fading of the downlink signal from BS 102 seen by the receiver of SS 116. Solid-line curve 320a represents the frequency selective fading of the downlink signal from BS 102 seen by the receiver of SS 115.

In accordance with the principles of the present disclosure, SS 115 and SS 116 measure one or more parameters of the received downlink signals and report channel quality indicator (CQI) data back to BS 102. BS 102 uses this channel quality feedback information to schedule SS 115 and SS 116 to receive in certain subbands. In the example in FIG. 3, SS 116 is scheduled on subbands SB1, SB2, SB6, SB7 and SB8, where the channel quality for SS 116 is better than the channel quality for SS 115. SS 115 is scheduled on subbands SB3, SB4 and SB5, where SS 115 has relatively higher received power. Thus, the relative fading at each subscriber station is used to determine subband allocation 350 near the bottom of FIG. 3. By scheduling subscriber stations on subbands with relatively higher channel quality, the SINR of the subscriber stations and the overall system capacity may be greatly improved.

Figure 4:
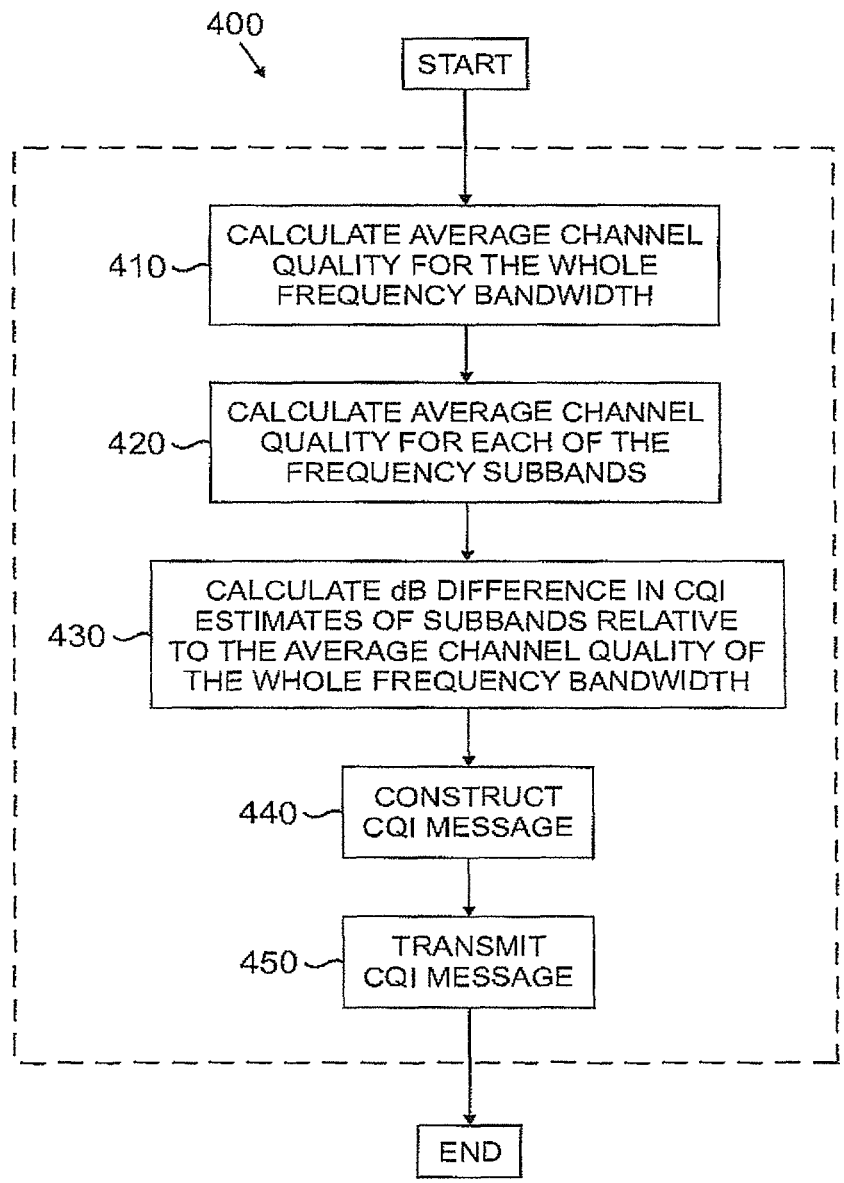
FIG. 4 is a flow diagram illustrating the feedback of CQI information according to the principles of the disclosure.

FIG. 4 depicts flow diagram 400, which illustrates the feedback of CQI information according to the principles of the disclosure. Initially, CQI calculation block 285 (in SS 115, for example) calculates a total average channel quality indicator (CQI) value for the entire bandwidth occupied by the 512 subcarriers in FIG. 3 (process step 410). Next, CQI calculation block 285 calculates an average CQI for each of the subbands SB1-SB8 (process step 420). CQI calculation block 285 then determines the relative difference between the total average CQI value and each individual subband average CQI value (process step 430). Next, CQI calculation block 285 (or an equivalent functional block in SS 115) constructs a CQI message based on the total average CQI and relative subband CQI (RSCQI) (process step 440). Finally, SS 115 transmits the CQI message to BS 102.

It should be noted that it is not strictly necessary to calculate the total average CQI value based on the entire bandwidth occupied by all of the subcarriers. In alternate embodiments, the total average CQI value may be based on a representative subset of the subcarriers. For example, the total average CQI value may be determined from the subcarriers in subbands SB2 through SB7, while subcarriers in subbands SB1 and SB8 are not used to determine the total average CQI value. In another example, the total average CQI value may be calculated using only the even numbered subcarriers (or only the odd numbered subcarriers) from all of the subbands, or from less than all of the subbands. These alternative methods require less processing power, but may provide less accurate estimates for the total average CQI value.

Similarly, it is not strictly necessary to calculate the average CQI value within a particular subband using all of the subcarriers in the subband. In alternate embodiments, the average CQI value in a subband may be based on a representative subset of the subcarriers in that subband. For example, the relative CQI value for subband SB1 may be determined from only the odd subcarriers, or only the even subcarriers, in subband SB1. In another example, the relative CQI value for subband SB1 may be determined from, for example, 32 randomly selected ones of the 64 subcarriers in subband SB1.

Figure 5:
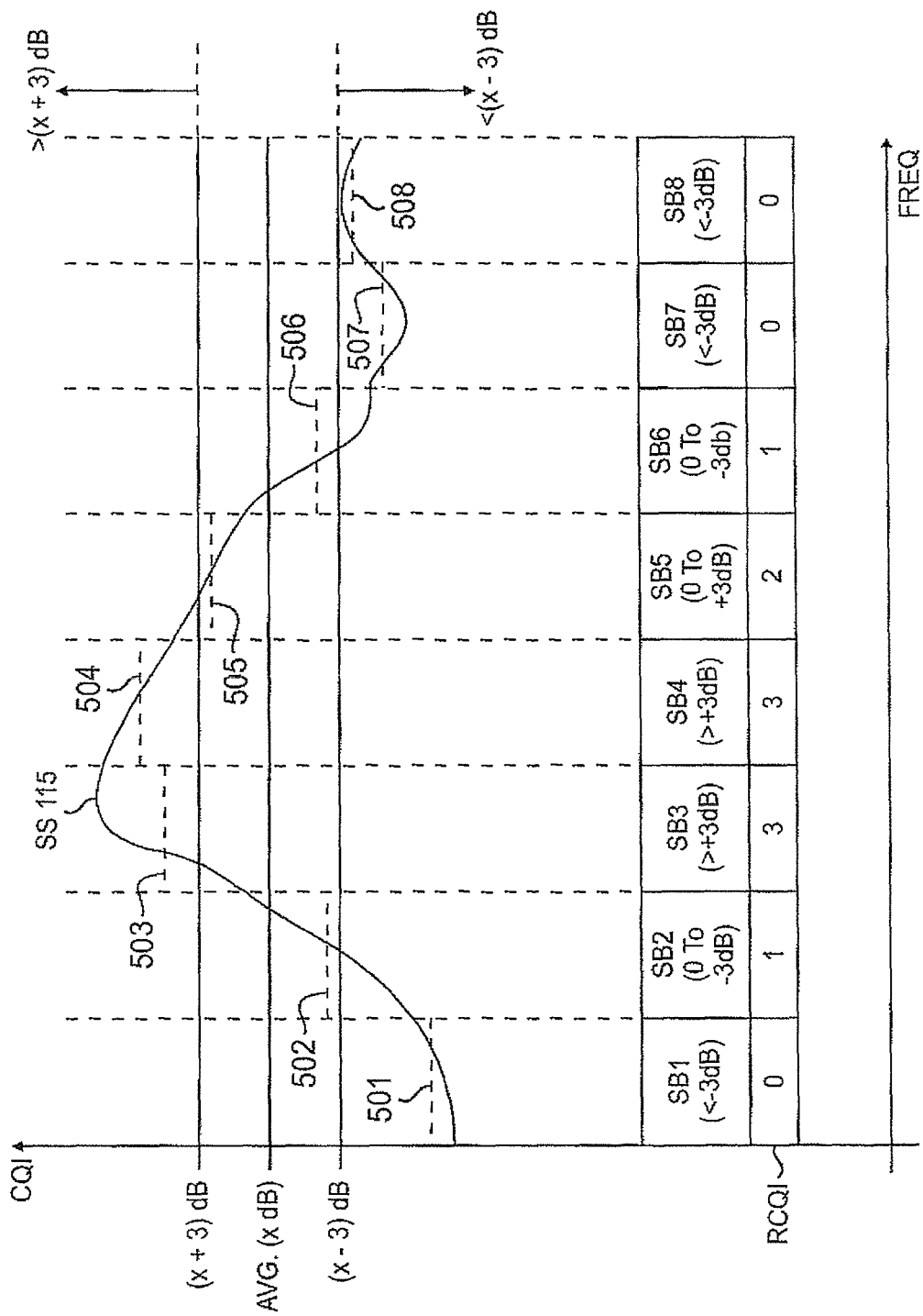
FIG. 5 illustrates CQI feedback according to one embodiment of the present disclosure.

FIG. 5 illustrates CQI feedback according to one embodiment of the present disclosure. In FIG. 5, the received signal level for SS 115 is shown across the entire 512 subcarriers of SB1 through SB8. Three relative signal levels are shown by horizontal solid lines. The middle line represents the total average signal level, namely x dB, across the entire spectrum. The bottom line represents a power level that is 3 dB below the total average, namely (x−3) dB. The top line represents a power level that is 3 dB above the total average, namely (x+3) dB. The (x−3) dB line, the x dB line, and the (x+3) dB line define four regions that represent relative channel quality indication (RCQI) levels.

The first RCQI level (RCQI=0) is the region below the (x−3) dB line. The second RCQI level (RCQI=1) is the region between the (x−3) dB line and the x dB line. The third RCQI level (RCQI=2) is the region between the (x+3) dB line and the x dB line. The fourth RCQI level (RCQI=3) is the region above the (x+3) dB line.

In the example of FIG. 5, dotted lines 501-508 represent the average CQI level within each of the subbands SB1-SB8 respectively. The location of each of dotted lines 501-508 within the four regions defined by the RCQI levels 0, 1, 2, and 3 determines the RCQI value for the corresponding subband. In FIG. 5, RCQI values of 0, 1, 3, 3, 2, 1, 0, and 0 are respectively fed back to BS 102 as the channel quality indicators for subbands SB 1-SB8, respectively.

TABLE 1 illustrates an example of selected portions of a CQI feedback message according to the principles of the present disclosure.

TABLE 1

| QUANTITY | NUMBER OF BITS |
| --- | --- |
| Total Average CQI | B0 |
| SB1 CQI | B1 |
| SB2 CQI | B2 |
| SB3 CQI | B3 |
| ... | ... |
| SBn CQI | Bn |

The CQI message uses B0 bits to quantize and indicate the average CQI across the whole bandwidth. The CQI message uses B1, B2, . . . Bn bits, respectively, to indicate the average CQI for subbands SB1 through SBn, respectively. Thus, the CQI feedback overhead is the sum (B0+B1+ . . . +Bn) bits.

An exemplary CQI feedback message for FIG. 5 is shown in TABLE 2.

TABLE 2

| Avg. | SB1 | SB2 | SB3 | SB4 | SB5 | SB6 | SB7 | SB8 |
| --- | --- | --- | --- | --- | --- | --- | --- | --- |
| 1011 | 00 | 01 | 11 | 11 | 10 | 01 | 00 | 00 |

The total average CQI across the entire spectrum is indicated by four (4) bits (B0=4) that may represent up to 16 different levels of CQI. These 16 levels may, for example, indicate CQI in increments of 1 dB for the range from 0.0 dB to +15 dB. The relative CQI for each of subbands SB1-SB8 is indicated using two (2) bits. With 2-bits, 4 levels of RCQI may be indicated. In this example, the total average CQI is 11 dB (1011).

In an alternate embodiment of the disclosure, an effective signal-to-noise (SNR) is calculated and fed back to the transmitter instead of the average CQI. The effective SINR may be calculated based on the channel capacity formula. First, the average channel capacity is calculated using Shannon capacity formula:

$$C = \frac{1}{K} \cdot \sum_{k=1}^{K} \log(1 + SNR_k),$$

where K is the total number of subcarriers used for effective SNR calculation and k is the subcarrier index. The effective SNR may then be calculated as below:

$SNR_{EFF} = 2^{C-1}$

Figure 6:
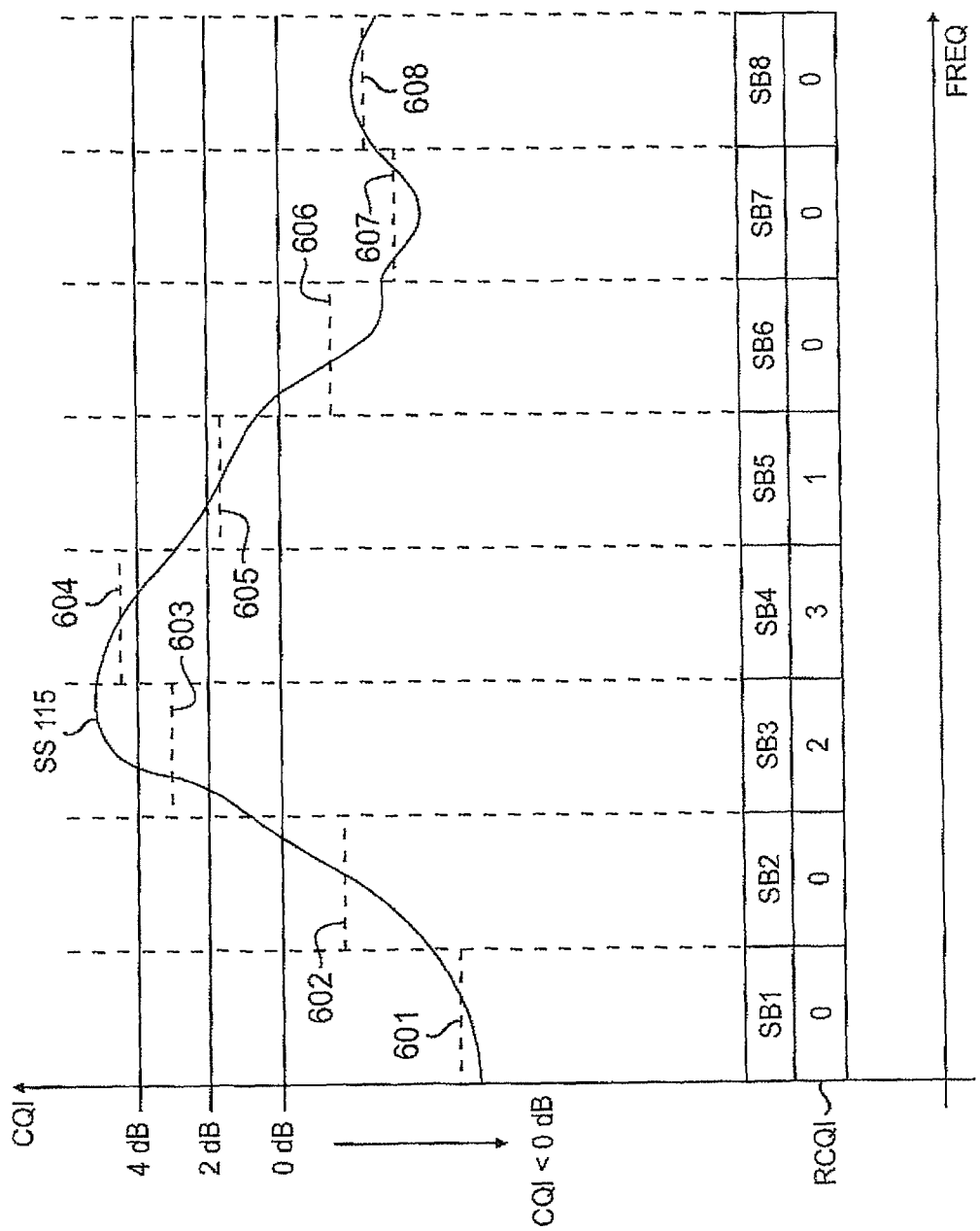
FIG. 6 illustrates CQI feedback according to an alternate embodiment of the present disclosure.

FIG. 6 illustrates CQI feedback according to an alternate embodiment of the present disclosure. In FIG. 6, unequal quantization levels are used to quantize the subband RCQI levels. The total average signal level across the whole band is assumed to be 0 dB for convenience. The average signal levels within subbands SB1-SB8 are indicated by dotted lines 601-608, respectively. In general, a subscriber station is scheduled on subbands at higher CQI to maximize the received signal-to-interference and noise ratio (SINR). Therefore, it is important to characterize the updates relative to the average in an accurate manner. A subscriber station is less likely to be scheduled on a subband that is in a down-fade. Therefore, a down-fade may be quantized with a lower granularity.

In the example of FIG. 6, each up-fade relative to the 0 dB average is characterized by one of three RCQI levels: 1, 2 and 3. An RCQI of 1 indicates the region between 0 dB and 2 dB. An RCQI of 2 indicates the region between 2 dB and 4 dB. An RCQI of 3 indicates the region above 4 dB. However, a down fade is characterized by only a single RCQI level: 0. The four RCQI levels may be indicated by two binary bits, resulting in a 16-bit overhead for the eight (8) subband case. In addition, 4 bits may be used to quantize the total average CQI across the whole bandwidth. Therefore, the total overhead in this case is 20 bits. In the example of FIG. 6, only three subbands, namely SB3, SB4 and SB5 are above the average CQI. These three subbands, SB3, SB4 and SB5, are indicated by RCQI levels of 2, 3 and 1 respectively. All other subbands are below 0 dB and are denoted by RCQI level 0.

Additionally, there is no requirement that the step size of quantization levels be equal. For example, in FIG. 6, the step size for RCQI levels 1 and 2 are both 2 dB. However, in an alternate embodiment, an RCQI of 1 may indicate the region between 0 dB and 2 dB, while an RCQI of 2 may indicate the region between 2 dB and 6 dB. Thus, the step size is 2 dB for RCQI level 1 and 4 dB for RCQI level 2.

In another embodiment of the disclosure, the relative CQI values for the subbands are calculated relative to the average CQI in time and frequency. This average CQI value then represents the long-term CQI value due to path loss and shadow fading. By averaging over time and frequency, the effect of Doppler due to fading is averaged out. In such an embodiment, the total average CQI may be fed back at a relatively low rate. This is due to the fact that channel gain due to path loss and shadow fading varies very slowly as a function of time. However, the instantaneous subband CQI can be calculated relative to the long-term average CQI and fed back more frequently.

In one embodiment of the present disclosure, different CQI feedback formats may be selected based on the channel type (or channel characteristics). The channel type may be estimated using the reference preamble or pilot signal transmitted from BS 102. The channel type includes, among other things, the extent of multipath or frequency-selectivity in the channel. In case of a single-path or flat-fading channel, only a single RCQI value is fed back at a given time because of the absence of frequency-selectivity in the channel. Therefore, the CQI format contains a single RCQI value which applies to all the subbands in the frequency domain. On the other hand, in a multi-path frequency-selective channel, different subbands see different fading. Therefore, the RCQI format may include subband RCQI values as described above. After estimating the channel type, the CQI format is determined and CQI value are fed back to the base station based on the selected CQI format.

Figure 7:
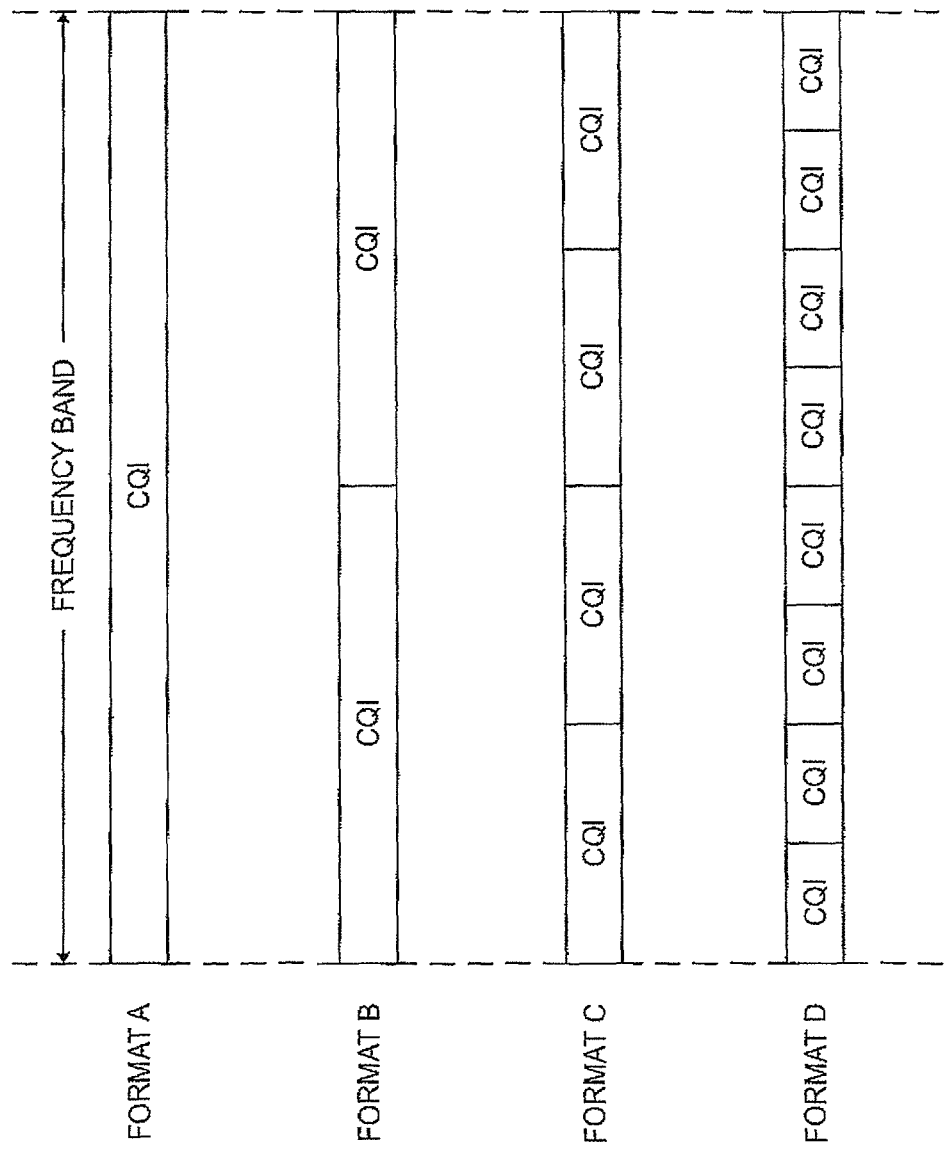
FIG. 7 illustrates multiple CQI feedback formats according to the principles of the present disclosure.

FIG. 7 illustrates multiple CQI feedback formats according to the principles of the present disclosure. By way of example, in a flat-fading channel type, Format A is used to transmit a single CQI value to BS 102. In a slightly frequency-selective fading channel type, Format B is used to transmit two RCQI values to BS 102. In a moderately frequency-selective fading channel type, Format C is used to transmit four RCQI values to BS 102. Finally, in a highly frequency-selective fading channel type, Format D is used to transmit eight RCQI values to BS 102.

In a wireless mobile system, a Doppler shift is observed due to the relative mobility between the transmitter and the receiver. In a cellular system, the base stations are at fixed locations. Therefore, the Doppler shift occurs due to the mobility of the subscriber station. The Doppler shift is function of the subscriber station speed and the carrier frequency and is written as D=fv/C, where C is the speed of light, f is the carrier frequency, and v is the subscriber station speed.

The channel quality varies faster as a function of time for higher Doppler relative to lower Doppler. Similarly, the channel quality varies faster as function of time at a higher carrier frequency for the same subscriber station speed. In order for to obtain accurate channel estimates for scheduling, the CQI feedback rate may be higher for a higher carrier frequency. Thus, the CQI feedback rate may be selected adaptively based on the operating frequency.

Figure 8:
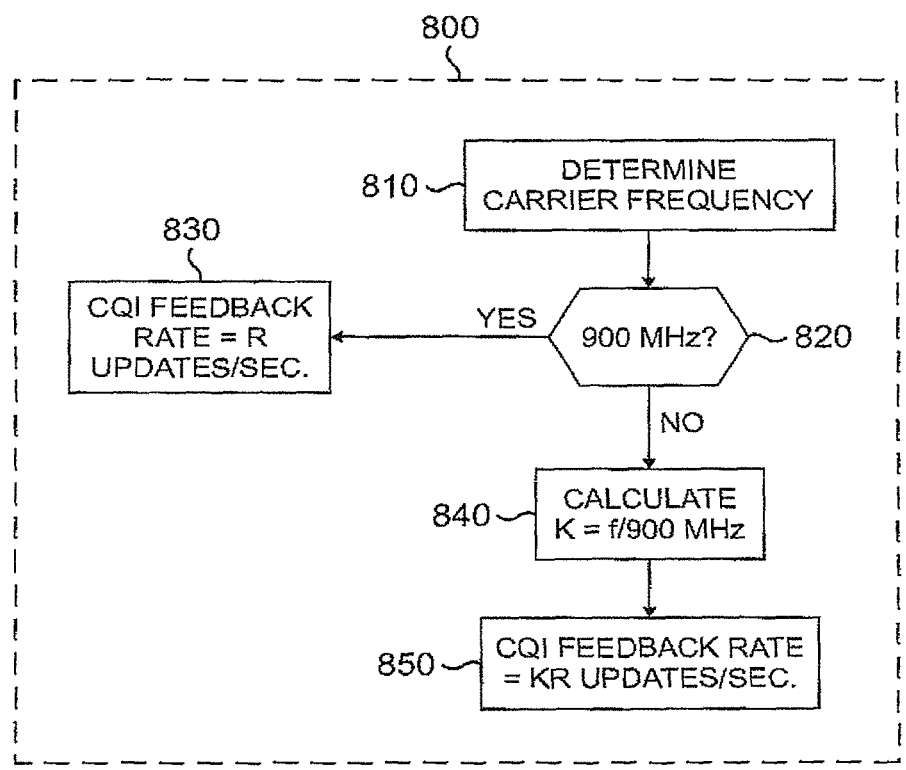
FIG. 8 illustrates CQI feedback rate selection based on the operating carrier frequency.

FIG. 8 depicts flow diagram 800, which illustrates CQI feedback rate selection based on the operating carrier frequency according to the principles of the present disclosure. Wireless systems may be deployed under a variety of carrier frequencies. This affects the CQI feedback rate. By way of example, to obtain the same performance, the CQI feedback rate may be four (4) times greater in a 3.6 GHz wireless network than in a 900 MHz wireless network.

In FIG. 8, the carrier frequency of the wireless network is initially determined (process step 810). Next, it is determined whether the carrier frequency is 900 MHz (process step 820). If yes, the basic feedback rate is set to R updates/second for a 900 MHz system (process step 830). If no, the ratio, K, between the actual operating frequency, f, and the 900 MHz reference frequency is calculated (process step 840). The CQI feedback rate is then selected as KR updates/second (process step 850).

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method of receiving a channel quality indicator (CQI) in a communication system, the method comprising:
receiving a message including a CQI for an entire band and a differential CQI for a subband;
acquiring the CQI for the entire band from the message; and
acquiring a CQI for a subband from the differential CQI,
wherein the differential CQI for the subband is based on subtracting the CQI for entire band from the CQI for the subband, and
wherein the CQI for the entire band comprises 4 bits and the differential CQI for the subband comprises 2 bits.

2. The method of claim 1, further comprising acquiring a differential CQI for each subband.

3. The method of claim 1, wherein the CQI for the entire band and the differential CQI for the subband are received in one message.

4. The method of claim 1, further comprising determining one of a feedback format without the differential CQI for the subband and a feedback format with the differential CQI for the subband.

5. The method of claim 1, wherein the 2 bits indicates four differential CQI for the subband, and wherein a number of differential CQI for the subband that are greater than 0 is more than a number of differential CQI for the subband that are less than or equal to 0.

6. A method of transmitting a channel quality indicator (CQI) in a communication system, the method comprising:
acquiring a CQI for an entire band;
acquiring a differential CQI for a subband based on subtracting the CQI for the entire band from a CQI for the subband; and
transmitting the CQI for entire band and the differential CQI for a subband,
wherein the CQI for the entire band comprises 4 bits and the differential CQI for the subband comprises 2 bits.

7. The method of claim 6, further comprising acquiring a differential CQI for each subband.

8. The method of claim 6, wherein the CQI for the entire band and the differential CQI for the subband are transmitted in one message.

9. The method of claim 6, further comprising determining one of a feedback format without the differential CQI for the subband and a feedback format with the differential CQI for the subband.

10. The method of claim 6, wherein the 2 bits indicates four differential CQI for a subband, and wherein a number of differential CQI for the subband that are greater than 0 is more than a number of differential CQI for the subband that are less than or equal to 0.

11. An apparatus of a base station for receiving a channel quality indicator (CQI) in a communication system, wherein the base station is configured to:
receive a message including a CQI for an entire band and a differential CQI for a subband;
acquire the CQI for entire band from the message; and
acquire a CQI for the subband from the differential CQI,
wherein the differential CQI for the subband is based on subtracting the CQI for the entire band from the CQI for the subband, and
wherein the CQI for the entire band comprises 4 bits and the differential CQI for the subband comprises 2 bits.

12. The apparatus of claim 11, wherein the base station is further configured to acquire a differential CQI for each subband.

13. The apparatus of claim 11, wherein the CQI for the entire band and the differential CQI for a subband are received in one message.

14. The apparatus of claim 11, wherein the base station is further configured to determine one of a feedback format without the differential CQI for the subband and a feedback format with the differential CQI for the subband.

15. The apparatus of claim 11, wherein the 2 bits indicates four differential CQI for the subband, and wherein a number of differential CQI for the subband that are greater than 0 is more than a number of differential CQI for the subband that are less than or equal to 0.

16. An apparatus of a subscriber station for transmitting a channel quality indicator (CQI) in a communication system, wherein the subscriber station configured to:
 acquire a CQI for an entire band;
 acquire a differential CQI for a subband based on subtracting the CQI for the entire band from a CQI for the subband; and
 transmit the CQI for the entire band and the differential CQI for the subband,
 wherein the CQI for the entire band comprises 4 bits and the differential CQI for the subband comprises 2 bits.

17. The apparatus of claim 16, wherein the subscriber station is further configured to acquire a differential CQI for each subband.

18. The apparatus of claim 16, wherein the CQI for the entire band and the differential CQI for the subband are transmitted in one message.

19. The apparatus of claim 16, wherein the subscriber station is further configured to determine one of a feedback format without the differential CQI for the subband and a feedback format with the differential CQI for the subband.

20. The apparatus of claim 16, wherein the 2 bits indicates four differential CQI for a subband, and wherein a number of differential CQI for the subband that are greater than 0 is more than a number of differential CQI for the subband that are less than or equal to 0.

* * * * *